United States Patent [19]
Foladare et al.

[11] Patent Number: 5,831,860
[45] Date of Patent: *Nov. 3, 1998

[54] PACKAGE SPECIAL DELIVERY SERVICE

[75] Inventors: Mark Jeffrey Foladare, Kendall Park; Shelley B. Goldman, East Brunswick; David Phillip Silverman, Somerville, all of N.J.

[73] Assignee: AT&T Corp., Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 431,228

[22] Filed: Apr. 28, 1995

[51] Int. Cl.$^6$ .................................................. B07C 17/00
[52] U.S. Cl. .............................. 364/478.07; 364/479.01; 364/200; 364/478.08; 364/478.15; 364/479.06; 364/479.07; 364/479.12; 364/403
[58] Field of Search ................................ 235/153; 370/19; 340/825.44; 358/257; 178/26 R; 346/478.07; 382/1; 364/479.01, 479.06, 479.07, 479.12, 479.14, 403, 181, 478.08, 478.15, 478.01, 200

[56] References Cited

U.S. PATENT DOCUMENTS

| | | | |
|---|---|---|---|
| 3,609,694 | 9/1971 | Brenner | 364/478.15 |
| 4,571,699 | 2/1986 | Herzog et al. | 358/408 |
| 4,644,351 | 2/1987 | Zabarsky et al. | 340/825.44 |
| 5,043,881 | 8/1991 | Hamazaki et al. | 364/200 |
| 5,337,044 | 8/1994 | Folger et al. | 340/825.44 |
| 5,422,821 | 6/1995 | Allen et al. | 364/478.07 |
| 5,469,362 | 11/1995 | Hunt et al. | 364/478.01 |
| 5,518,122 | 5/1996 | Tilles et al. | 209/539 |

Primary Examiner—Reba I. Elmore
Assistant Examiner—McDievnel Marc

[57] ABSTRACT

It is possible to redirect a package in mid-transit, so as to deliver it to the addressee who will not be at the location to which the package was originally addressed when the package would otherwise be delivered. To do so, a package carrier, prior to delivering a package to an address specified by the sender, determines if the addressee desires the package to be rerouted to a different address. This determination is prompted by detection of the fact that the addressee is not in the vicinity of the address specified by the sender. The location of the addressee is determined from the location of a two-way pager associated with the addressee as detected by a paging antenna, e.g., tower, of a conventional two-way paging. A comparison is made between the location of the addressee and the address specified by the sender. If there is a disparity and the addressee subscribes to the package special delivery redirection service, the package is then processed according to the instructions of the addressee. One instruction that can be left by the addressee is to call the addressee and ask if he wishes the package to be redirected, and, if so, what should be the new address. Another instruction that can be left by the addressee is to automatically reroute the package to a destination which may be determined as a function of the location of the addressee.

22 Claims, 2 Drawing Sheets

PACKAGE SPECIAL DELIVERY SERVICE

TECHNICAL FIELD

This invention relates to the delivery of packages to a person at the location at which the person is actually located.

BACKGROUND OF THE INVENTION

It has been recognized in the art that many individuals who receive a packages are highly mobile. However, in the prior art, packages are delivered only to the destination address that was specified when the package was shipped. If the intended recipient, i.e., addressee, is not at the specified destination and will not be returning to that location prior to needing the contents of the package, he will have to make arrangements to have the package shipped to his new location or make do without the package.

SUMMARY OF THE INVENTION

We have recognized that in certain situations, it is possible to redirect a package in mid-transit so as to deliver it to the addressee who will not be at the location to which the package was originally addressed when the package would otherwise be delivered. In accordance with the principles of the invention, a package carrier, prior to delivering a package to an address specified by the sender, determines if the addressee desires the package to be rerouted to a different address. This determination is prompted by detection of the fact that the addressee is not in the vicinity of the address specified by the sender.

In a particular embodiment of the invention, the location of the addressee is determined from the location of a two-way pager associated with the addressee as detected by a paging antenna, e.g., tower, of a conventional two-way paging system. A comparison is made between the location of the addressee and the address specified by the sender. If a) there is a disparity and b) the addressee subscribes to the package special delivery redirection service, the package is then processed according to the prestored instructions of the addressee.

For example, one possible instruction that can be left by the addressee is for the package carrier to call the addressee, or his representative, and ask if the package should be redirected, and, if so, what should be the new address, if it is not prestored. If the addressee responds affirmatively, the package is redirected to the new address. If the addressee responds negatively, or the addressee cannot be contacted, the packaged is either a) delivered to the original address or b) held until the addressee can be contacted, depending on the preference of the addressee. Another possible instruction that can be left by the addressee is to automatically reroute the package to a new destination which may be determined as a function of the location of the addressee.

Advantageously, the techniques of the invention may be applied so that no address need be specified for the package upon its being given over by the sender to the package shipper. Instead, only the addressee need be specified. The actual address to which the package is delivered is determined at a later time, e.g., a) when the package reaches the package carrier's centralized location for package processing, b) when the package arrives in the destination city, or c) when the package arrives in the general vicinity of the location of the addressee.

DETAILED DESCRIPTION

Figure 1:
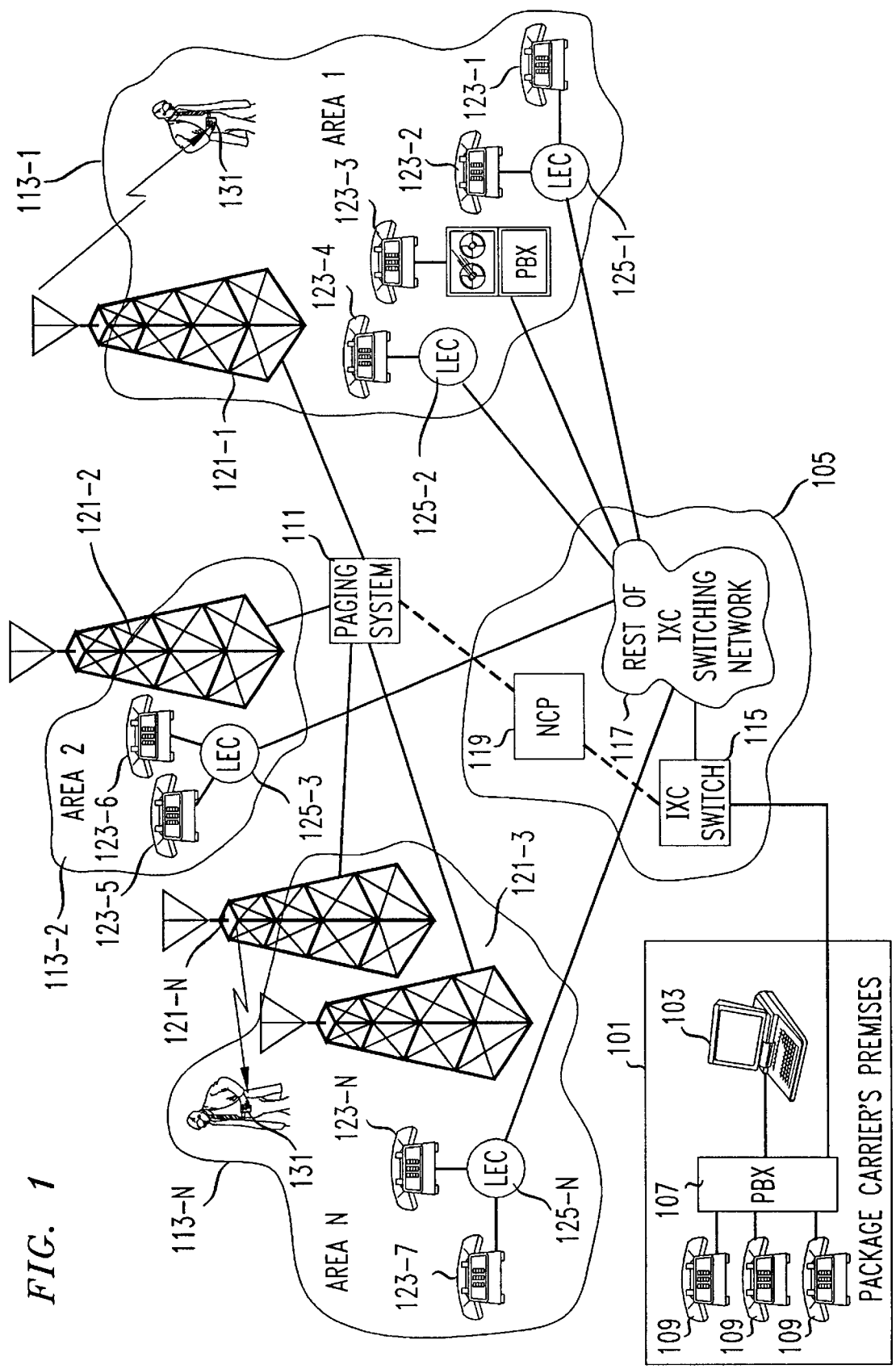
FIG. 1 shows an exemplary system for processing packages in response to a determination of the present location of the addressee, in accordance with the principles of the invention.

FIG. 1 shows an exemplary system for processing packages in response to a determination of the present location of the addressee, in accordance with the principles of the invention. In particular, shown in FIG. 1 are (a) interexchange carrier (IXC) network 105, (b) two-way paging system 111, and (c) paging areas 113, which include paging areas 113-1 through 113-N. IXC network 105 includes (1) IXC switch 115, (2) rest of IXC switching network 117, and (3) a data base, e.g., the well-known network control point (NCP) 119. Each of paging areas 113 includes (i) at least one of paging antennas 121, which include paging antennas 121-1 through 121-N, and optionally, (ii) telephones 123, which include telephones 123-1 through 123-N, and (iii) one or more of LECs 125, which include "Local Exchange Carriers (hereinafter "LEC")" 125-1 through 125-N. Paging areas 113 may be in the same city, in different cities, or in a combination thereof.

According to the invention, a sender ships a package to an addressee at the addressee's address. The package carrier, who is to deliver the package from the sender to the addressee, may receive the package at a branch office, or drop-off box, or may send a courier to the sender's location to pick up the package. At some point in the process of transporting the package by the package carrier, the package makes its way to package carrier's premises 101. The package carrier recognizes from the addressee, or the address, that the addressee has subscribed to the package special delivery redirection service. This may be determined by entering the addressee's name, or the address, into computer 103, in which the package carrier stores a list of addressees who have subscribed to the package special delivery redirection service, and performing a lookup. If the addressee is determined to have subscribed to the package special delivery redirection service, computer 103 launches a query to NCP 119 to, in accordance with an aspect of the invention, determine in which one of areas 113, if any, the addressee is presently located. The query is routed, for example, via "Private Branch Exchange (hereinafter "PBX")" 107 and IXC switch 115.

At any given time, the one of areas 113, if any, in which the addressee is located may be determined by signaling the called parties' two-way paging device 131 to determine the location of the two-way pager from its response. Such signaling is not that which is typically known in the art as a page, because the signal is not designed to result in an alert of any type at the called parties' two-way paging device 131. The location of two-way paging device 131 is determined by, for example, which of the one of antenna 121 receives the strongest response from two-way paging device 131.

The signaling for a particular party may be undertaken by two-way paging system 111 in response to a request from NCP 119 for the current one of areas 113, if any, in which the addressee is presently located. The resulting location is then transmitted from paging system 111 to NCP 119 upon its determination. Another way by which may be determined the one of areas 113, if any, in which the addressee is presently located is for paging system 111 to transmit, on its own, the particular area 113 in which the addressee is located to NCP 119 each time two-way paging system 111 determines that the addressee has changed areas 113. Thus, the current location information is constantly updated and stored in NCP 119. A third way in which the present location of the addressee may be determined is for two-way paging system 111 to store, and continually update as it changes, the present location of the addressee and to provide the stored information to NCP 119 in response to a particular request therefrom.

In accordance with an aspect of the invention, NCP 119 determines the current geographic location of the addressee based on the particular area 113 that was identified as the area 113 in which the addressee is currently located. For example, the geographic location might be specified as a ZIP code, or a subsection thereof. Alternatively, the geographic location might be specified as one or more area codes to which the addressee has indicated that calls to him when he is within the particular area in which the addressee is currently located. This determination is achieved by employing a table stored in NCP 119 mapping tower 121 identities to the chosen geographic location indicators.

In accordance with the principles of the invention, a comparison is made between the location of the addressee and the address specified by the sender. If there is a disparity, the package is then processed according to the instructions of the addressee. Such instructions are typically stored by the carrier, e.g., in computer 103. For example, one possible instruction that can be left by the addressee is to call the addressee, or his representative, and ask if the package should be redirected, and, if so, what should be the new address. If the addressee responds affirmatively, the package is redirected to the new address. If the addressee responds negatively, or the addressee cannot be contacted, the packaged is either a) delivered to the original address or b) held until the addressee can be contacted, depending on the preference of the addressee. Another possible instruction that can be left by the addressee is to automatically reroute the package to a new destination which may be determined as a function of the location of the addressee.

Figure 2:
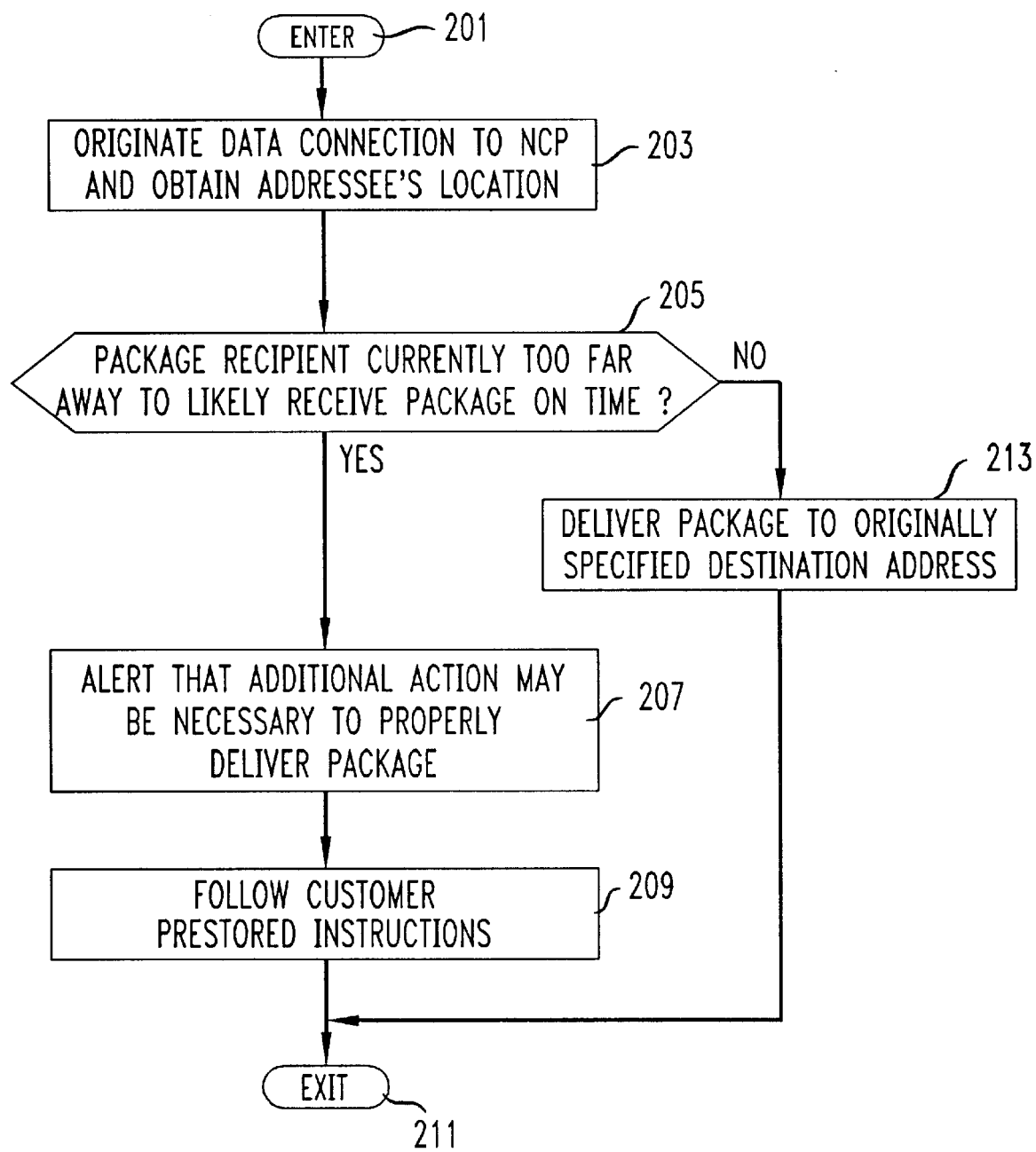
FIG. 2 shows an exemplary process for providing a package special delivery redirection service in accordance with the principles of the invention.

FIG. 2 shows an exemplary process for providing the package special delivery redirection service in accordance with the principles of the invention. The process is entered in step 201, a predetermined point in the package delivery process, when a package carrier has received a package addressed to the addressee at its package processing premises, e.g., a centralized processing location such as premises 101, and it determines that the addressee subscribes to the package special delivery redirection service. Next, in step 203, computer 103 originates a connection to NCP 119 and obtains therefrom the current location of the addressee. Thereafter, conditional branch point 205 tests to determine if the package recipient is currently too far away to be likely to receive the package on time.

If the test result in step 205 is YES, control passes to step 207, in which the package carrier is alerted that additional action may be necessary to properly deliver the package. Next, in optional step 209, the package carrier follows the customer's prestored instructions for delivery of the package. The prestored instructions may associate a particular course of action with a particular location in which the addressee is located. The process then exits in step 211.

If the test result in step 205 is NO, control passes to step 213 and the package carrier delivers the package to the originally specified address in the conventional manner. The process then exits in step 211.

TABLE 1

| Customer Identification No. | Location | Send-To Address |
|---|---|---|
| 500-55-3001 | Manhattan | Manhattan Office |
|  | California | California Office |
| 800-55-3179 | Chicago | Hold Package |
|  | Manhattan | Manhattan Office |
|  | Connecticut | Manhattan Office |
|  | All Others | Call customer |
| 800-55-2106 | Kansas City | Kansas City Home |
|  | Not Kansas City | Call Customer |

Table 1 shows an exemplary package routing instructions table in which is stored various customers' instructions for delivery of packages. Such a table may be used by the package carrier in optional step 209. Note that the offices listed in Table 1 are those of the addressees, not of the package carrier. To get a better feel for the example, assume that area 113-1 is Manhattan, area 113-2 is Connecticut, area 113-3 (not shown) is Kansas City, and location 113-N is California. The mapping of areas to locations will be readily apparent to those skilled in the art.

Although the invention is described in terms off a two-way paging device, it will be readily apparent to those skilled in the art that any two-way wireless communications device that is only served by one wireless communication source, e.g., tower, at any particular time may be used to identify the location of the addressee.

Notwithstanding that the apparatus for performing the determination of whether a package needs handling other than delivering it to the address specified by the sender is shown collocated at the courier's premises, it is noted that such a system may also be located at any convenient location provided that a connection may be made thereto from the location of the package.

It is noted that the delivery treatment associated with any particular location may be time dependent.

Also, although NCP 119 is shown as part of IXC network 105, it will be appreciated that a data base storing the current location of the addressee, for purposes of the invention, may be placed at other locations. For example, the information containing the location of the addressee may be stored in a database in two-way paging system 111.

In another embodiment of the invention, using the current location of the package, the location and movement of the addressee, the latest acceptable delivery time for the package, and the location and availability of delivery personnel, the optimal time and location for delivery of the package can be determined and updated on a real-time basis. This can be achieved using well-known algorithms that are used for calculating optimal delivery schedules. Moreover, delivery schedules can be updated in real time as a function of the movements of package recipients.

While the foregoing contemplates that the package has an address initially supplied by the sender, such an address is not necessary. In particular, the addressee can subscribe to a "find-me" delivery service where the delivery location for a package is not even initially determined until the package arrives at a package carrier's centralized package transit location. Once the package arrives at the centralized location, the package carrier accesses an addressee location database, e.g., stored in computer 103, which is updated a) by the addressee directly supplying an indication of his location or b) automatically, e.g., via a two-way pager, to determine the city that the addressee will be in at the expected time of delivery. For example, the package carrier may cause the addressee to be paged with a message telling him that a package is to be delivered, and confirming that the addressee will remain in the city in which he is currently located. The addressee supplies his response via his own two-way pager. If the addressee will not remain in the current city, the package carrier contacts the addressee using two-way paging to determine the destination city. The package is then sent to the correct city.

The package carrier also need not know the exact location of the addressee until just prior to delivery of the package. Instead, the package carrier need only know the city in which the package is to be delivered. The city may be determined as described above. Once the city is known, the package is placed on a delivery route based upon the current location of the addressee, which is obtaining using the addressee's two-way pager. If the addressee changes location before delivery, the package carrier is informed, so as to be able to reroute the package. Once in the immediate area of the addressee, the package carrier may contact the addressee, e.g., by telephone or two-way paging, to arrange for actual delivery. Advantageously, a package may be delivered to a person without having been given an explicit address by the sender. Indeed, a particular address need not be supplied until just before delivery.

The foregoing merely illustrates the principles of the invention. It will thus be appreciated that those skilled in the art will be able to devise various arrangements which, although not explicitly described or shown herein, embody the principles of the invention and are thus within its spirit and scope.

The invention claimed is:

1. A method for routing a package comprising the steps of:
   receiving a package by a package carrier for delivery to an intended recipient;
   determining an actual physical location of said intended recipient;
   ascertaining whether the actual physical location of said intended recipient is within a vicinity of an address associated with said intended recipient; and
   supplying a prestored alternative delivery treatment instruction, to be applied to the delivery of said package, specified for the condition when the step of ascertaining determines that the intended recipient is not within the vicinity of said address.

2. The method as defined in claim 1 further including the step of delivering said package to an alternate address when said intended recipient is not within the vicinity of said address.

3. The method as defined in claim 1 wherein said alternative delivery treatment instruction is supplied to said package carrier.

4. The method as defined in claim 1 wherein said alternative delivery treatment instruction is supplied by said intended recipient.

5. An apparatus for routing a package comprising:
   means for receiving an indication of an actual physical location of an intended recipient of a package;
   means for determining in advance of delivery of said package that said intended recipient is not within a vicinity of an address associated with said intended recipient; and
   means for originating a communication session with said intended recipient when said intended recipient is not within the vicinity of said address.

6. The apparatus as defined in claim 5 wherein said communication session is a telephone call.

7. The apparatus as defined in claim 5 wherein said communication session is a message exchange via two-way paging.

8. The apparatus as defined in claim 5 wherein information is communicated over said communication session indicating to deliver said package to said address.

9. The apparatus as defined in claim 5 wherein information is communicated over said communication session indicating to deliver said package to the actual physical location of said intended recipient rather than said address associated with said intended recipient.

10. An apparatus for routing a package, said apparatus comprising:
    means for determining an actual physical location of an intended recipient of a package;
    means for determining that said intended recipient is not within a vicinity of an address associated with said intended recipient; and
    means for alerting a package carrier that said intended recipient is not within the vicinity of said address.

11. The apparatus as defined in claim 10 further including means for supplying an alternate address to which said package is to be delivered when said intended recipient is not within the vicinity of said address associated with said intended recipient.

12. The apparatus as defined in claim 10 further including means for storing an alternate processing treatment for said package.

13. A method for use in routing a package by a package carrier, said method comprising the steps of:
    determining an actual physical location of an intended recipient of said package;
    ascertaining whether there exists a disparity between the actual physical location of the intended recipient and an address associated with said intended recipient; and
    alerting the package carrier when the ascertaining step determines that there is a disparity.

14. An apparatus for use in arranging for the delivery of a package, said apparatus comprising:
    means for determining that said package is to be delivered to an intended recipient at an address associated with said intended recipient; and
    means for causing the delivery of said package to a different address as a function of the actual physical location of said intended recipient at a particular point in the delivery process.

15. The apparatus as defined in claim 14 further including means for ascertaining that said intended recipient will not be at said associated address.

16. The apparatus as defined in claim 14 wherein said means for causing is responsive to prestored instructions of said intended recipient.

17. An apparatus for use in arranging for the delivery of a package, said apparatus comprising:
    means for determining that said package is to be delivered to an intended recipient at an address associated with said intended recipient;
    means for scheduling a delivery time for said package; and
    means for causing the delivery of said package to an address different from said associated address as a function of said intended recipient being at an actual physical location other than the associated address at a particular point in the delivery process of said package, wherein said location is at least a predetermined distance from said associated address.

18. The apparatus as defined in claim 17 wherein said means for causing includes means for determining that said intended recipient subscribes to a package redirection service.

19. The apparatus as defined in claim 17 wherein said means for causing includes means for communicating with said intended recipient to determine if said intended recipient intends to be at said associated address at the scheduled time of delivery.

20. The apparatus as defined in claim 17 wherein said means for scheduling is employed to reschedule said package for delivery at said address different from said associated address.

21. The apparatus as defined in claim 17 wherein said associated address is specified by a package sender.

22. The apparatus as defined in claim 17 wherein said associated address is specified as a function of the identity of said intended recipient.

* * * * *